(12) United States Patent
Corbin

(10) Patent No.: US 6,647,573 B2
(45) Date of Patent: Nov. 18, 2003

(54) AIR TRAVEL PILLOW

(76) Inventor: David Allan Corbin, 4120 Carola Ct., San Jose, CA (US) 95130

( * ) Notice: Subject to any disclaimer, the term of this patent is extended or adjusted under 35 U.S.C. 154(b) by 0 days.

(21) Appl. No.: 10/090,572

(22) Filed: Mar. 5, 2002

(65) Prior Publication Data

US 2003/0167571 A1 Sep. 11, 2003

(51) Int. Cl.⁷ .............................. A47G 9/00; A47C 7/38
(52) U.S. Cl. .............................. 5/655.3; 5/652; 5/644; 297/391
(58) Field of Search .......................... 5/652, 644, 655.3, 5/630, 636, 655; 297/391, 392, 393

(56) References Cited

U.S. PATENT DOCUMENTS

| | | | |
|---|---|---|---|
| 98,859 A | 1/1870 | Fast | 297/393 |
| 1,212,515 A | 1/1917 | Leavitt | 5/636 |
| 1,349,258 A | 8/1920 | Blocksom | 5/490 |
| 2,336,707 A | 12/1943 | Thompson | |
| 2,522,120 A | 9/1950 | Kaskby et al. | 5/644 |
| 3,241,161 A | 3/1966 | Dashosm | 5/490 |
| 3,327,330 A | 6/1967 | McCullough | |
| 3,400,413 A * | 9/1968 | La Grossa | 5/636 |
| 4,060,863 A | 12/1977 | Craig | |
| 4,139,920 A | 2/1979 | Evans | 5/911 |
| 4,235,472 A * | 11/1980 | Sparks et al. | 5/652 |
| 4,345,347 A | 8/1982 | Kantor | |
| 4,679,262 A | 7/1987 | Davis | |
| 4,754,510 A * | 7/1988 | King | 5/652 |
| 4,783,866 A | 11/1988 | Simmons et al. | 5/421 |
| 5,020,174 A * | 6/1991 | Sarkozi | 5/640 |
| 5,471,690 A * | 12/1995 | McNeil | 5/644 |
| 5,611,601 A * | 3/1997 | Cowgur | 297/393 |
| 5,645,319 A * | 7/1997 | Parks, Jr. | 5/644 |
| 6,009,577 A | 1/2000 | Day | 5/636 |
| 6,042,185 A * | 3/2000 | Cowgur | 297/393 |

FOREIGN PATENT DOCUMENTS

| | | | | |
|---|---|---|---|---|
| GB | 838455 | | 6/1960 | 297/393 |
| GB | 2269741 | * | 2/1994 | 5/655 |

* cited by examiner

Primary Examiner—Alexander Grosz

(57) ABSTRACT

A travel pillow designed specifically for commercial airline travel is disclosed. The unique feature of this travel pillow is that it is designed to provide support from the front rather than the back. It essentially allows the user to lean forward effortlessly, place the head down and sleep without worrying about the head flopping forward as with any pillow designed to support the back of the head. The pillow consists of a large, firm but soft object comprising about 1.5 cubic feet, sized and shaped to fit on the food service tray available with any airline seat, and includes a platform for placing a typical airline pillow on top.

1 Claim, 3 Drawing Sheets

AIR TRAVEL PILLOW

BACKGROUND OF THE INVENTION

Research and experience have indicated that all known devices designed to provide comfort for travelers consist of some sort of support for the back of the user; lumbar supports, neck pillows etc. Considering that most travel is done in a sitting position this makes sense. However, unless the user is able to recline backwards to about 35 degrees or more, any attempt to fall asleep usually results in the head tilting forward until it falls and wakes the person up. Most airline seats do not allow the occupant to recline to this degree and are generally useless for sound sleeping.

What most, if not all, airline seats do allow is the use of a food service tray for holding a meal, a book, a computer or whatever. These trays are actually sturdy enough to hold quite a bit of weight and can easily support a person leaning a small percentage of their body weight at approximately a 20 degree angle. The device described in this application takes advantage of this fact as well as the fact that a sleeping person will tend to lean forward if sitting upright.

SUMMARY OF THE INVENTION

The present invention is a travel pillow specifically designed for use in air travel. It is unique in that it supports the traveler in a new way and allows the traveler to rest or sleep comfortably without worrying about falling out of position and disturbing a neighbor or waking up. The invention consists of a rather large, (approximately 1.5 cubic feet) firm, pillow implemented as a traditional pillow but, for the sake of portability, and as shown in the detailed description and figures, is implemented as an inflatable device that can be easily inflated by the user's breath or a manual or powered air pump.

The travel pillow comprises a large, firm but soft object with a volume of about 1.5 cubic feet, sized and shaped to fit on the food service tray available with any airline seat, and includes a platform for placing a typical airline pillow on top. Said platform is designed to keep the pillow from falling off the travel pillow when the user is asleep.

DETAILED DESCRIPTION OF THE INVENTION

The claims of this application include any embodiment of a travel pillow as described herein. To minimize the length of this application a single, preferred embodiment is described and illustrated.

The preferred embodiment is an inflatable pillow. This allows easy portability and compact size when not inflated.

One key feature is the size of the valve used to inflate and deflate the pillow. The diameter is at least ½" allowing easy inflation by mouth, with minimally restricted airflow. When it comes time to deflate the pillow, it can be done rapidly for the same reason.

Figure 1:
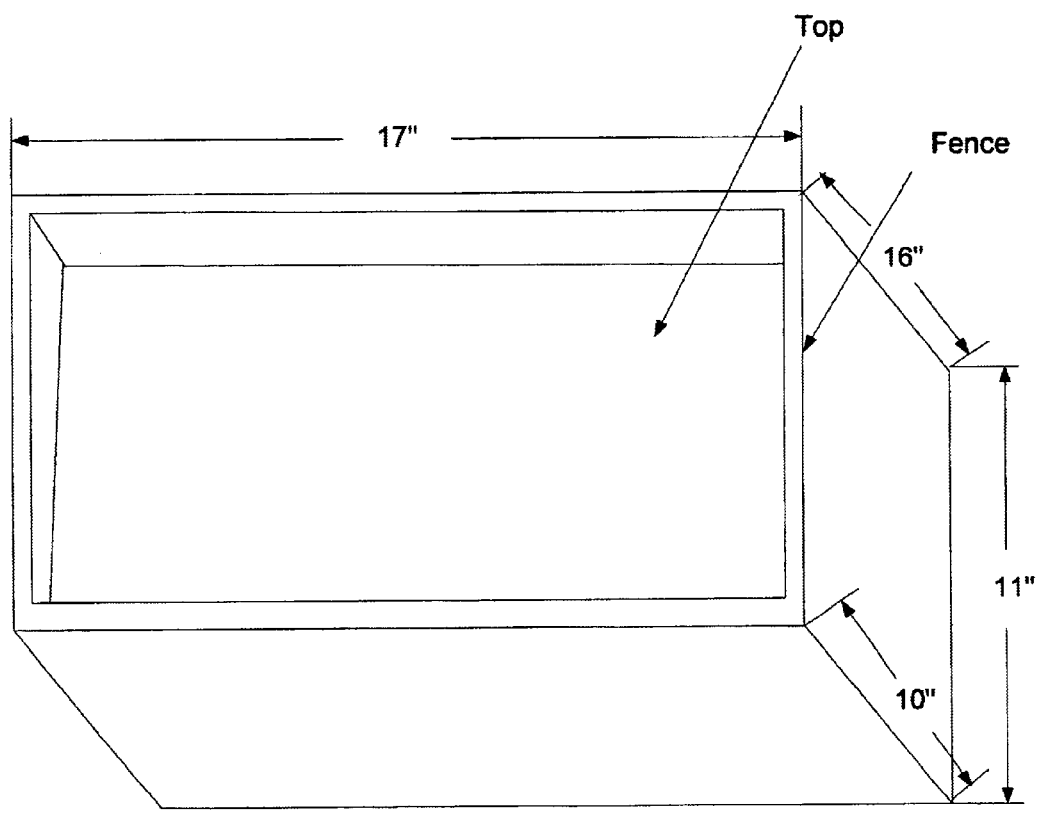
FIG. 1 shows a front perspective view of the invention, including dimensions.
Figure 2:
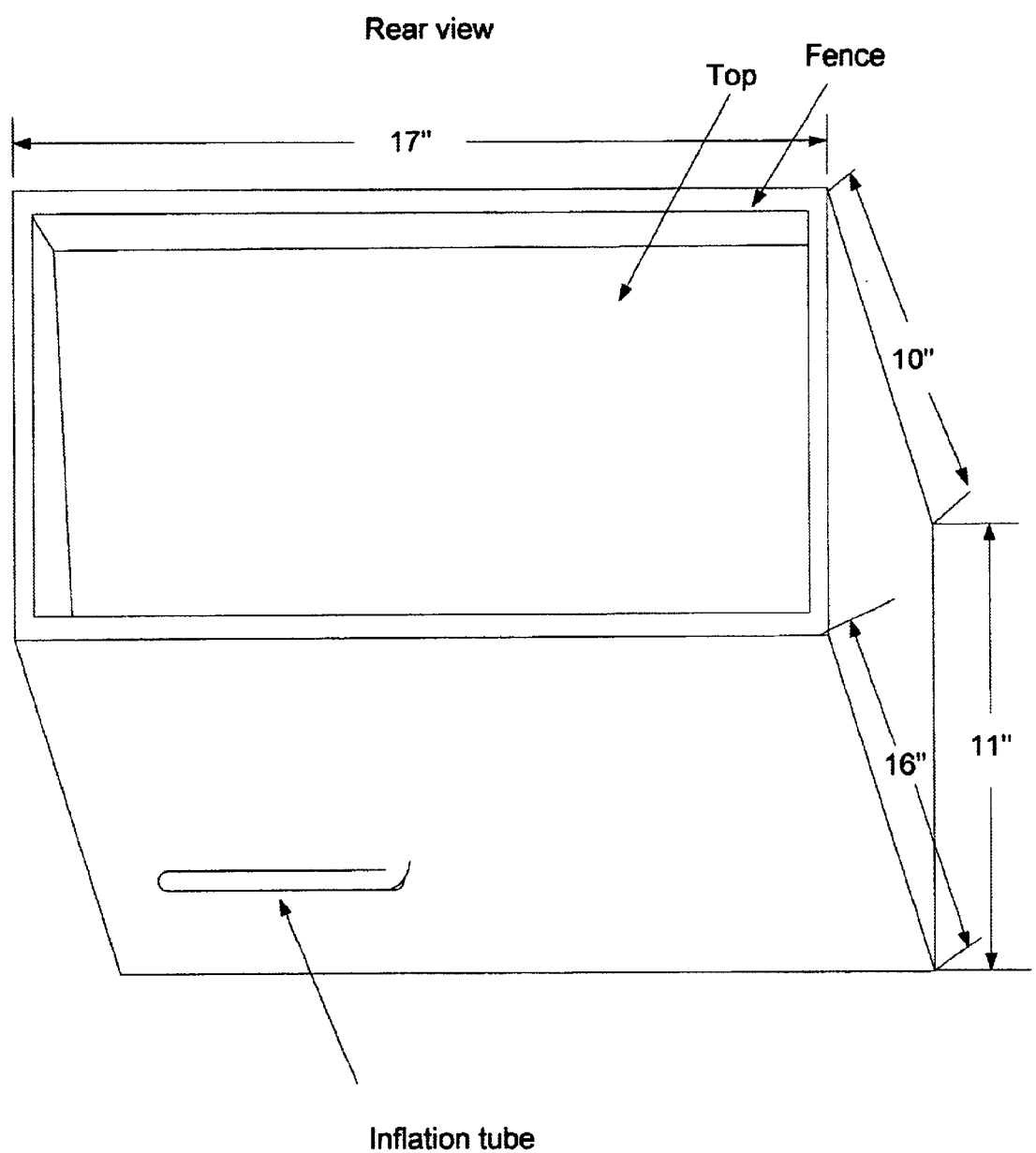
FIG. 2 shows a rear perspective view of the invention, including dimensions.

As shown in FIGS. 1 and 2, the pillow is roughly a rectangular cube but with the top slanted to provide a more comfortable angle to incline and rest the head. As mentioned above the inflation valve is of a standard type having a diameter or ½" for fast inflation and deflation. The inflation valve is located on the back so that it cannot cause discomfort. At the top is a low "fence" intended to hold a small fabric pillow that is normally available on all flights. The fence helps keep the pillow from sliding off but is not large enough to be annoying if the small fabric pillow is not available.

The construction is quite simple, allowing for very cost effective manufacturing. The material used can be either sheet vinyl or PVC of about 0.003" thickness. The pillow can be made from only three pieces of material; top, bottom and composite sides. The fence is created during construction by allowing the top to sag inward and then creating multiple other partial seams 1" down the side and parallel to the top. With gaps to allow air to flow into the fence. For the contact area i.e. five of the 6 sides, a fibrous coating commonly referred to as "flocking" is applied, This provides a small amount of absorption for perspiration, although it is expected that this pillow will normally be used in conjunction with a small fabric pillow normally available on most flights.

Figure 3:
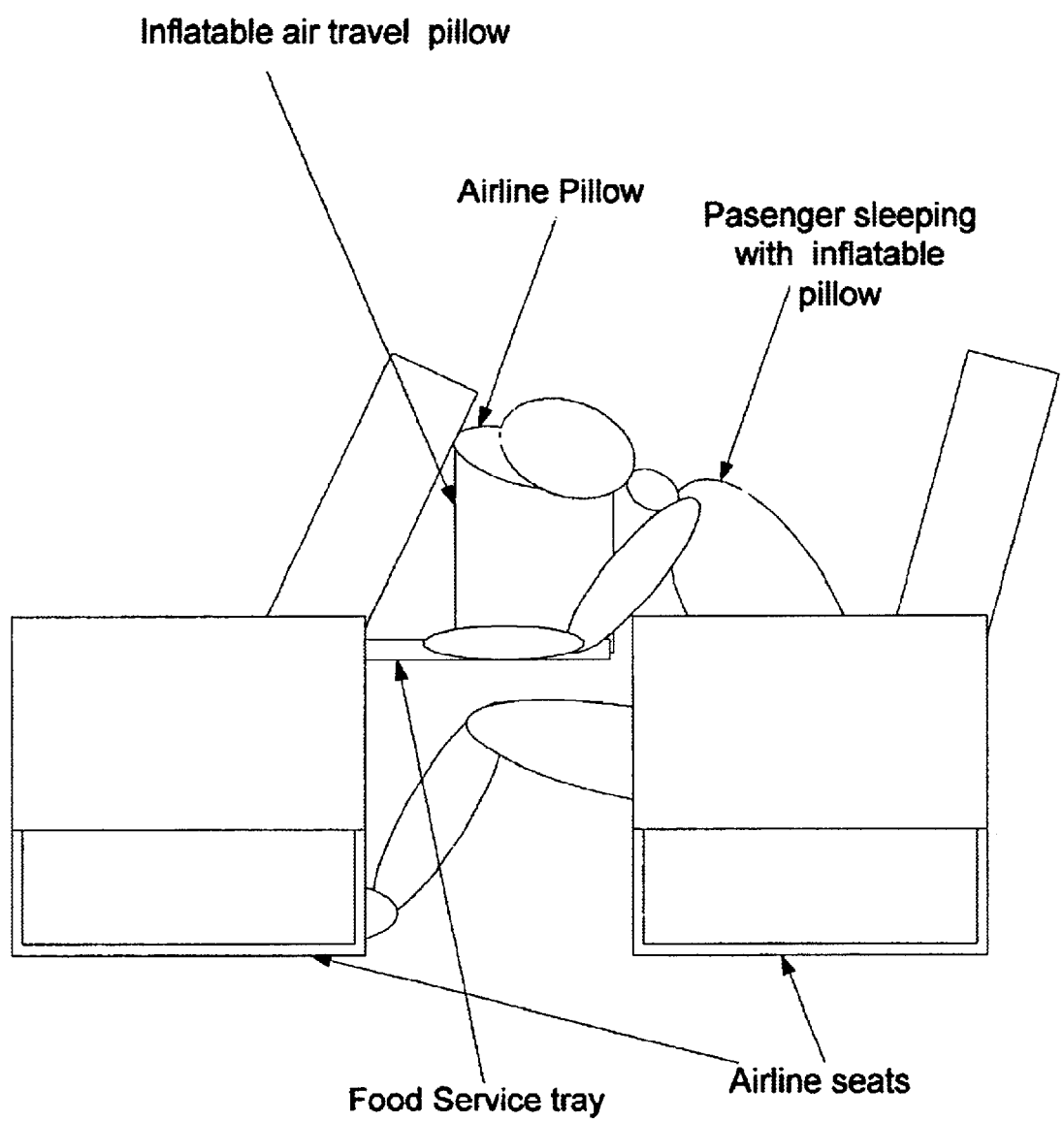
FIG. 3 shows the invention in use.

FIG. 3 depicts the pillow in use. What is shown is a side view of two rows in an airliner. The rear-most seat is occupied by a passenger who is using the pillow. He has lowered his tray and placed the pillow on it. On top of the travel pillow the passenger has placed the optional small in-flight pillow provided on most flights. Because of the additional height provided by the travel pillow, the user is able to lean forward and rest their head on the pillow and rest or sleep comfortably.

Although the above description describes a specific implementation of the invention, this should not be construed as limitations on the scope of the invention. Many variations are possible, which would be obvious to anyone skilled in the art of industrial design. Accordingly, the scope of the invention should be determined by the scope of the appended claims and not just by the embodiments described and illustrated herein.

What is claimed is:

1. An inflatable pillow, having a volume of about 1.5 cubic feet, generally in the shape of a cube with six sides, said pillow having a slanted top surface that at its perimeter has an integral fence portion that is raised relative to said top surface, said pillow adapted to be placed on a food service tray of an airline seat, said fence portion adapted to retain a small pillow on said top surface.

* * * * *